UNITED STATES PATENT OFFICE.

WALTER SCHOELLER AND WALTHER SCHRAUTH, OF BERLIN, GERMANY, ASSIGNORS TO FARBENFABRIKEN VORM. FRIEDR. BAYER & CO., OF ELBERFELD, GERMANY, A CORPORATION OF GERMANY.

ALKALI PHENOLATES OF ORTHOÖXYMERCURIC SALICYLIC ANHYDRID.

967,838.     Specification of Letters Patent.     Patented Aug. 16, 1910.

No Drawing.    Application filed May 20, 1909.    Serial No. 497,302.    (Specimens.)

*To all whom it may concern:*

Be it known that we, WALTER SCHOELLER and WALTHER SCHRAUTH, doctors of philosophy, chemists, citizens of the German Empire, residing at Berlin, Germany, have invented new and useful Improvements in Alkali Phenolates of Orthoöxymercuric Salicylic Anhydrid, of which the following is a specification.

Our present invention relates to the preparation of the hitherto unknown alkali phenolates of the ortho-oxymercuric salicylic anhydrids of the formula:

("M" standing for an alkali metal).

For producing the products of the above given formula the solution of the known ortho-oxymercuric salicylic anhydrid (hydrargyrum salicylicum of the German *Pharmacopœia*) of the formula:

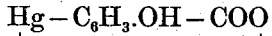

in one molecular proportion of caustic alkali lye is evaporated *in vacuo*. The products of the above given formula separate out. They can also be precipitated from the concentrated solution either by the addition of suitable agents e. g. methyl alcohol, acetone, etc., or any other similar method. The new compounds thus obtained are slightly colored odorless compounds which are very easily soluble in water and insoluble in ether. The sodium salt is insoluble in methyl alcohol, the corresponding calcium salt is insoluble in water. They have proved to be valuable antisyphilitics characterized by a mild action and the fact that they are non-irritant and not corrosive renders them highly valuable for internal application especially for subcutaneous injection. They can be used for preparing tablets by means of which aqueous solution of a distinct amount of mercury can be prepared with the greatest ease.

The new compounds have proved to be valuable disinfecting agents possessing great disinfecting power. They possess the advantage over mercuric chlorid that they do not precipitate albumen that is to say that they are not irritant and that the mercury contained therein does not blacken surgical instruments.

In order to illustrate our new process the following example is given, the parts being by weight: 20 parts of the ortho-oxymercuric compound of salicylic anhydrid (hydrargyrum salicylicum) (one molecular proportion) are dissolved in an aqueous solution of 2.38 parts of NaOH. The resulting solution is filtered and the filtrate is evaporated *in vacuo*. A slightly colored crystalline compound separates with an almost theoretical yield. On analysis the compound is found to have the formula:

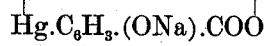

containing 55.97 per cent. of mercury. The same salt is obtained by adding methyl alcohol to the concentrated solution of one molecular proportion of the hydrargyrum salicylium in a solution of one molecular proportion of NaOH.

We claim:

1. The herein described new alkali phenolates of ortho-oxymercuric salicylic anhydrid of the above given formula obtainable from the ortho-oxymercuric compound of salicylic anhydrid, which are slightly colored compounds easily soluble in water and insoluble in ether and in methyl alcohol; which do not precipitate albumen; and are valuable therapeutic compounds, substantially as described.

2. The herein described new sodium phenolate of ortho-oxymercuric salicylic anhydrid of the above given formula, obtainable from the ortho-oxymercuric compound of salicylic anhydrid, which is a slightly colored crystalline compound easily soluble in water and insoluble in ether, insoluble in methyl alcohol; and is a valuable therapeutic compound, substantially as described.

In testimony whereof we have hereunto set our hands in the presence of two subscribing witnesses.

WALTER SCHOELLER.
    WALTHER SCHRAUTH.

Witnesses:
  HENRY HASPER,
  WOLDEMAR HAUPT.